United States Patent
Bağriaçik

(10) Patent No.: US 10,695,960 B2
(45) Date of Patent: Jun. 30, 2020

(54) ADJUSTABLE MOULDING TOOL AND CORRESPONDING MOULDING METHOD

(71) Applicant: Ertan Oral Bağriaçik, Istanbul (TR)

(72) Inventor: Ertan Oral Bağriaçik, Istanbul (TR)

( * ) Notice: Subject to any disclaimer, the term of this patent is extended or adjusted under 35 U.S.C. 154(b) by 634 days.

(21) Appl. No.: 15/501,890

(22) PCT Filed: May 14, 2015

(86) PCT No.: PCT/TR2015/000255
§ 371 (c)(1),
(2) Date: Feb. 6, 2017

(87) PCT Pub. No.: WO2016/022084
PCT Pub. Date: Feb. 11, 2016

(65) Prior Publication Data
US 2017/0225369 A1    Aug. 10, 2017

(30) Foreign Application Priority Data
Aug. 5, 2014    (TR) .................................. 2014/09100

(51) Int. Cl.
*B29C 39/44*    (2006.01)
*B29C 33/30*    (2006.01)
(Continued)

(52) U.S. Cl.
CPC .......... *B29C 39/44* (2013.01); *B29C 33/0061* (2013.01); *B29C 33/302* (2013.01);
(Continued)

(58) Field of Classification Search
None
See application file for complete search history.

(56) References Cited

U.S. PATENT DOCUMENTS

| | | | |
|---|---|---|---|
| 5,192,560 A * | 3/1993 | Umetsu ................ | B29C 33/302 249/155 |
| 5,330,343 A | 7/1994 | Berteau | |

(Continued)

FOREIGN PATENT DOCUMENTS

WO     WO2008154137 A1    12/2008

*Primary Examiner* — Jacob T Minskey
*Assistant Examiner* — Baileigh Kate Darnell
(74) *Attorney, Agent, or Firm* — Bayramoglu Law Offices LLC

(57) ABSTRACT

The application relates to an adjustable moulding tool and corresponding model production method, including following process steps: moving rods towards the said chamber through the said chamber's holey surfaces manually or via mechanisms in increments numbers of which are calculated through computer programs or manually, after the formation of the emptiness in the shape of the model, pouring of the material in a manner to fill the emptiness, heating and cooling or applying other processes in accordance with the characteristic of the poured material to enable that material takes the desired monolithic shape, after material takes the form of the model monolithically, making the casting chamber free of the rods, which have initially been moved towards the casting chamber with the purpose of the formation of the emptiness, by moving the rods in the reverse directions and taking out the produced model through an openable surface of the said chamber.

11 Claims, 6 Drawing Sheets

(51) Int. Cl.
  *B29C 33/00*  (2006.01)
  *B29C 39/24*  (2006.01)
  *B29C 39/26*  (2006.01)
  *B29C 39/38*  (2006.01)

(52) U.S. Cl.
  CPC ............ *B29C 33/308* (2013.01); *B29C 39/24* (2013.01); *B29C 39/26* (2013.01); *B29C 39/38* (2013.01)

(56) References Cited

U.S. PATENT DOCUMENTS

| | | | |
|---|---|---|---|
| 5,546,313 A | | 8/1996 | Masters |
| 5,846,464 A | * | 12/1998 | Hoffman ................ B23Q 1/035 |
| | | | 264/219 |
| 5,851,563 A | * | 12/1998 | Hoffman ................... B28B 7/02 |
| | | | 425/175 |
| 6,354,561 B1 | | 3/2002 | Fahrion |
| 6,462,840 B1 | * | 10/2002 | Kravtsov ................. G09F 9/33 |
| | | | 358/474 |
| 6,610,230 B2 | * | 8/2003 | Jiang ....................... B23P 15/24 |
| | | | 264/161 |
| 6,923,635 B2 | * | 8/2005 | Burgess .............. B29C 33/0011 |
| | | | 249/120 |
| 2008/0251975 A1 | | 10/2008 | Callagher et al. |

* cited by examiner

ADJUSTABLE MOULDING TOOL AND CORRESPONDING MOULDING METHOD

CROSS REFERENCE TO RELATED APPLICATIONS

This application is the national phase entry of International Application No. PCT/TR2015/000255, filed on May 14, 2015, which claims priority to Turkish application 2014/09100, filed on Aug. 5, 2014, the entire contents of which are incorporated herein by reference.

TECHNICAL FIELD

This invention is related to a flexible model production method (technique) which can be applied in manufacturing of any kind of model without being subject to any restriction stemming from product type and quantity and which mainly consists of stages of forming an emptiness in the shape of model and pouring material into this emptiness so that model is formed and, in the implementation of this method, flexible model production machine which consists of adjected chambers differing in size, geometrical shape—for instance such as rectangular prism, cube—according to usage purpose and containing parts with different functions and includes computer aided or more elementary manual mechanisms. In this Specification, model refers to any kind of maquette, home appliance, goods, intermediate good such as manufactured part, mold, prototype as well as end product.

BACKGROUND OF THE INVENTION

Techniques utilised in model production can be classified in four different categories. These model production techniques are deducting, forming, adjecting and molding. Below are explanations regarding each model production technique;

Deducting consists of hewing a single mass with hand, tool or computer aided cutting machines until it takes desired shape.

Forming describes processing materials which are suitable for being formed manually or by tool or machines such as press until desired product is produced.

Adjecting is gathering various material and parts together in order to form the desired product via different kinds of methods. Adjecting can be realized through methods, which depend on properties of materials being used, such as glueing, screwing, riveting, welding, soldering. 3D printing techniques, a relatively novel technology, are also in this category.

Molding is product manufacturing technique including stages of pouring materials into molds which have been previously formed through at least one of the various production techniques so that materials take shape of the mold and applying processing methods such as heating or cooling, which differ according to properties of material, so that materials solidify and become monolithic.

All intermediate and end products are produced via the utilisation of one or more production techniques mentioned above.

Particularly, in manufacturing industry, usage of molding technique is widespread as for the production of either intermediate or end product or any other production tool, mold is produced first and material is poured into the mold and subjected to processing.

However, via molds, only products which are in shape of molds can be produced, and whenever a change, even a minor one, in the design and shape of product, existing molds become obsolete and a new mold in the new shape of product is required to be produced.

Therefore although production technique of molding provides a considerable economic advantage as it makes possible to produce a high number of same kind products, serial production in other words, it lacks flexibility requisite for serial but also customisable production according to customers' individual expectations, which is also defined as customised serial production, without increasing cost. On the other hand, existence of patents regarding variable shaped mold production methods is observed. For instance, in the patent numbered U.S. Pat. No. 5,330,343A and issued on 19 Jul. 1994, a machine consisting of screw groups in which screws with tips formed to take shape of mold surfaces are adjacent to each other through their notches and collectively movable via computer aided mechanisms was described. However, this and similar machines are only related to the production of mold surfaces and they do not have numerous advantages of a production method which can make it possible to produce end products directly through significantly simplifying production stages so that they become processable within a single machine without the necessity of production of intermediate products such as molds.

SUMMARY OF THE INVENTION

Purpose of this invention is significantly simplifying production stages and facilitating production by enabling the formation of a product shape as an emptiness in a single machine and pouring proper material into the shaped emptiness to form the product without necessitating reproduction of molds according to shapes of different products or renewed shapes of same products, and also making it possible to decrease cost of reflecting changes in product design to production to a level near zero. With the utilisation of the invention, a significant cost advantage is to occur in the customised serial production. Furthermore, by the invention, it is going to be possible that unlimited number and type of products such as decorative goods, toys, and etc. become produceable at home as well.

Machine which is subject of this invention and is designed in a manner that enable the application of production technique which is also subject of this invention can be produced in different sizes and specifications according to the purpose of usage in industry and home. In comparison with the method where any pertinent intermediate product is produced through molding and therefore any change in design of a product leads to the production of a new mold, production of parts with renewed shapes can be switched to with almost zero cost and time through the usage of computer-aided automatically and/or manually movable mechanisms.

In the usage of machine in home indefinite type and number of maquettes, decorative goods are going to become produceable through the execution of software which can be coded to calculate required information of directions and movements to direct operations of manually movable mechanisms and/or automatic mechanisms. For instance, computer programs can be coded which can generate three dimensional technical drawing of any architectural building according to its pictures taken from different viewpoints, scale the maquette of this building according to the size of machine and consequently calculate which rods, located in which coordinates, situated in chambers adjacent to a casting chamber into which material is to be poured should be moved by how much distance towards this chamber so that shape of the model is formed as an emptiness in the machine. According to values calculated by these programs the rods are moved, an emptiness having the shape of the model to be produced is formed in the mentioned casting chamber and this emptiness is filled with material which is poured into the casting chamber. After the completion of the casting, material can be made monolithic by exposing the casting chamber to a suitable process according to the type of material, which might be heating and/or cooling or any other similarly proper process, and hence model production can be completed.

DETAILED DESCRIPTION OF THE INVENTION

Invention is related to computer aided or manual flexible model production method and computer aided flexible model production machine which applies the mentioned method's process stages. Process stages which constitute the invention's production method related part mainly cover two main process groups which are principally shaping of model as an emptiness emptiness and forming the model via the pouring of material into the shaped emptiness.

These process stages include, sequentially, moving rods—placed in chambers adjacent to a casting chamber having specific surfaces on which are holes located at specific intervals—towards the casting chamber through the holes on the holey surfaces of the mentioned casting chamber manually or via mechanisms such as electromechanical, electromagnetic, hydraulic, and etc. in increments numbers of which are calculated through computer programs or manually according to the to-be produced model's three-dimensional technical drawings drafted via computer softwares or manually so that in the casting chamber an emptiness in the shape of the to-be produced model is formed; after the formation of the emptiness in the shape of the model, in other words, after the completion of the rods' movements, pouring of material into the casting chamber in the manner and amount to fill the emptiness; heating and cooling or applying other processes in accordance with the characteristic of the poured material so that material takes the desired monolithic shape; after the material takes the form of the model monolithically, making the casting chamber free of rods, which have initially been moved towards the casting chamber with the purpose of the formation of the emptiness, by moving the rods in the reverse directions and taking out the produced model through an openable surface of the casting chamber.

Figure 1:
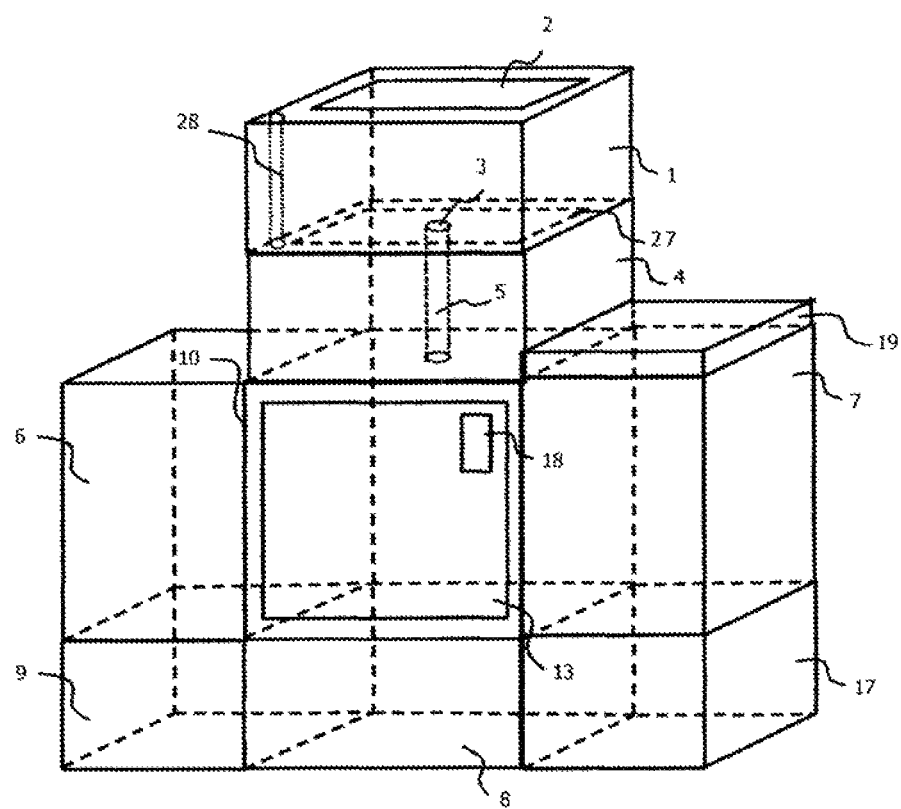
FIG. 1: Perspective view of the computer aided flexible model production machine through which emptiness is formed and material is poured into the emptiness

Working principles of the computer aided model production machine which applies process stages of the computer aided or manual flexible model production method and general perspective view of which is illustrated in the FIG. 1 are described as well in this Specification's following paragraphs via referring to the figures and the references in these figures which are stated in this Specification's section titled "Brief Description of the Drawings". Positionings and geometric forms of the parts are illustrated representatively in the figures; exclusion of some parts from the machine illustrated representatively in the figures within this application, usage of alternative parts instead of some parts for instance usage of electromagnetic and similar mechanisms instead of electromechanical actuator mechanism in performing rod movements—or any versions of the machine which are designed in different ways other than the one illustrated representatively in the figures within this application by changing positionings or geometric forms of some parts and/or their relative sizes in order to perform the process stages of the computer aided or manual flexible model production method being subject of this invention are also within the scope of this invention to the extent that they are related to the flexible production method being subject of this invention.

Figure 2:
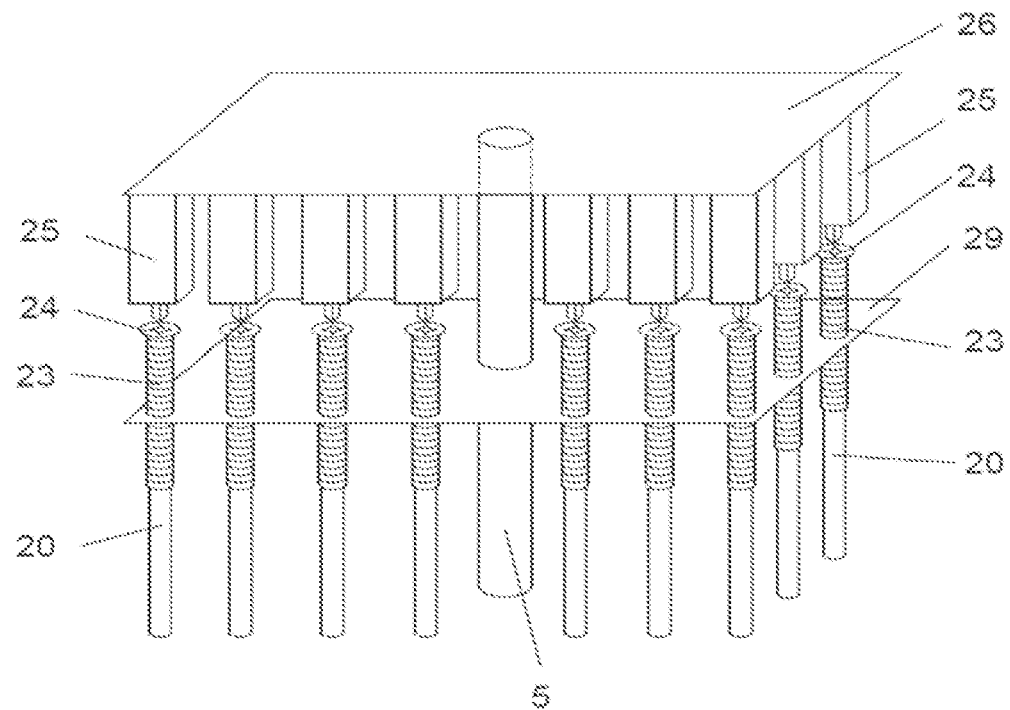
FIG. 2: Perspective view of the top rod chamber
Figure 3:
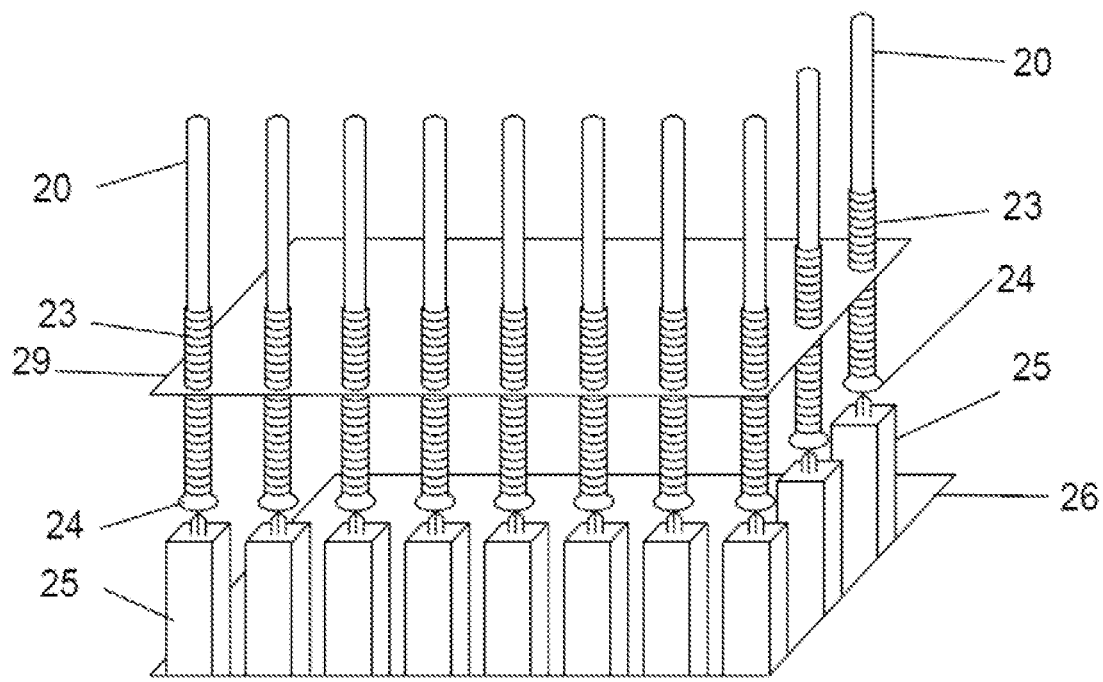
FIG. 3: Perspective view of the bottom rod chamber
Figure 4:
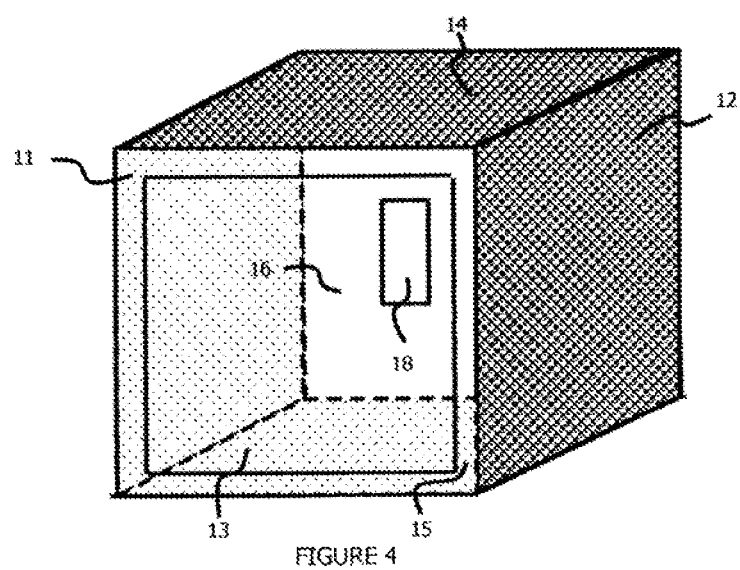
FIG. 4: Perspective view of the casting chamber
Figure 5:
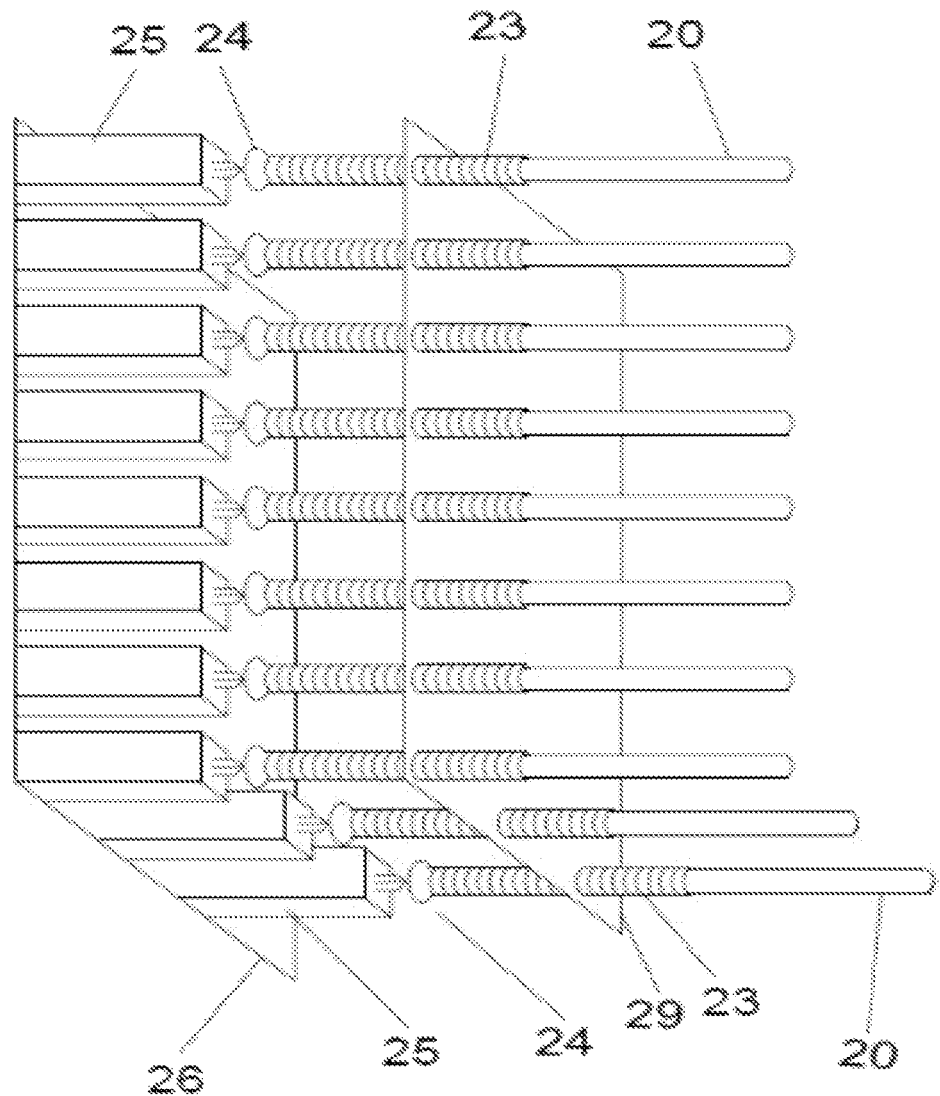
FIG. 5: Perspective view of the left rod chamber
Figure 6:
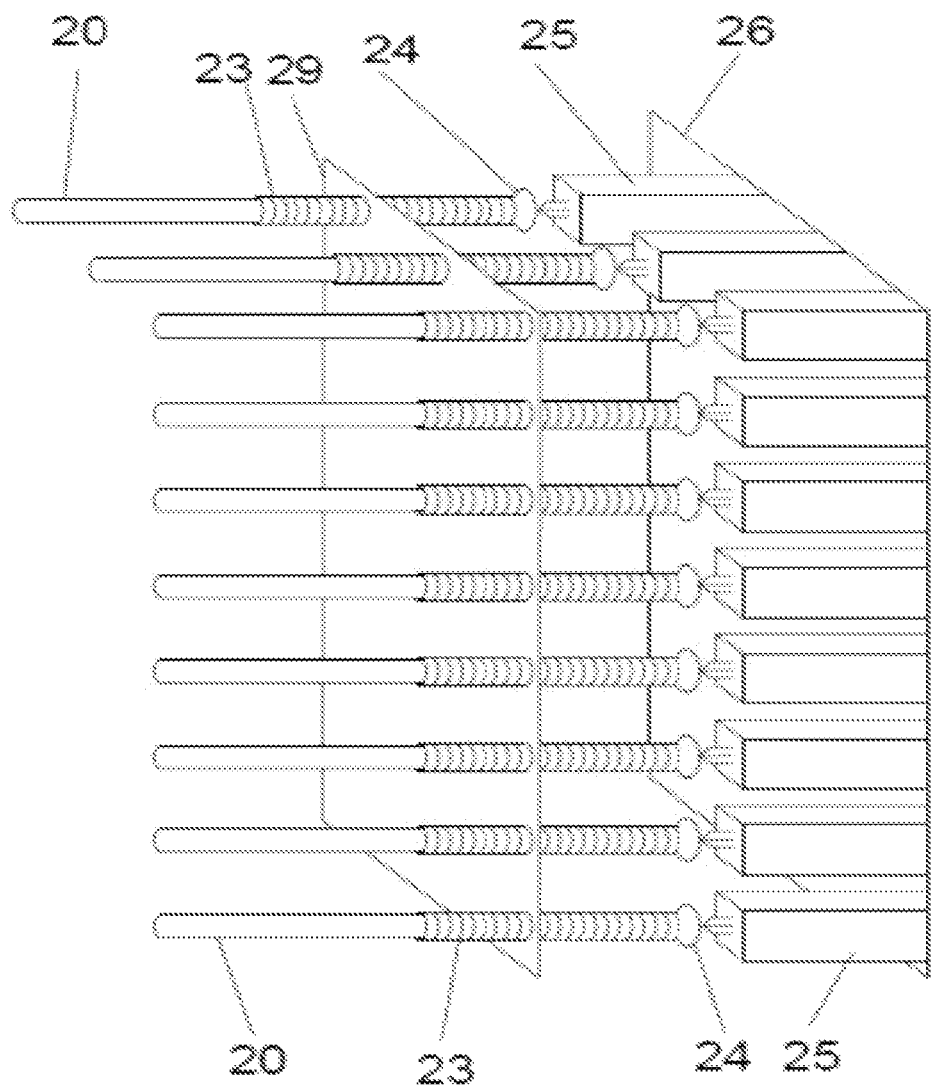
FIG. 6: Perspective view of the right rod chamber
Figure 7:
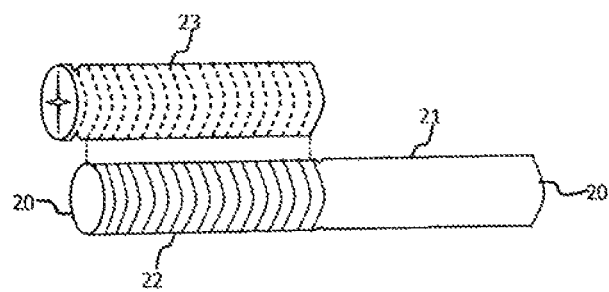
FIG. 7: Perspective view of rod and nut Parts in figures have been numbered; explanations of numbered parts are as following;
1: Material chamber
2: Material chamber cover
3: Material conveyance tap
4: Top rod chamber
5: Material conveyance channel (channel which passes through the top rod chamber (4) and in which material is conveyed from the material chamber (1) to the casting chamber (10) after the opening of the material conveyance tap (3))
6: Left rod chamber
7: Right rod chamber
8: Bottom rod chamber
9: Heating and cooling equipment
10: Casting chamber
11: Left side holey plate
12: Right side holey plate
13: Front panel
14: Top side holey plate
15: Bottom side holey plate
16: Back side plate
17: Power source chamber (contains battery and/or power cable and plug and/or, upon preference, renewable energy generators, storers and transmitters such as panel of solar energy cells)
18: USB socket and/or wireless data receiver
19: Logic board and electrical circuit component (In the FIG. 1, chamber where logic board is located is demonstrated representatively; electrical circuit reaches to all the chambers of the machine in which electric current is required)
20: Rods (can be made of steel or any other material which is compatible with mover mechanisms; rod consists of two portions, (21) and (22), with approximately equal or differing lengths)
21: Portion without threads
22: Portion with threads
23: Nut
24: Screwdriver tip
25: Screwdriver motor
26: Screwdriver tray (fixed screwdriver tray to which automatically rotatable screwdriver sets (screwdriver tip (24) and screwdriver motor (25)) are attached or internally movable screwdriver tray which makes it possible that those sets move horizontally, vertically and perpendicularly)
27: Weight measure device
28: Material height gauge
29: Nut layout tray

In the FIG. 5 perspective of the left rod chamber (6) is illustrated, perspective of the right rod chamber (7) illustrated in the FIG. 6 is vertically symmetric of the left rod chamber (6). The bottom rod chamber (8) illustrated in the FIG. 3 has the perspective to appear when the left external surface of the left rod chamber (6) is rotated towards the bottom plane. Therefore, the right rod chamber (7) illustrated in the FIG. 6 and the bottom rod chamber (8) illustrated in the FIG. 3 are in essence exact identicals of the left rod chamber (6) illustrated in the FIG. 5 in terms of shape. The top rod chamber (4) perspective view of which is illustrated in the FIG. 2 carries attributes of the horizontal symmetry of the bottom rod chamber (8); its difference from other rod chambers (the left rod chamber (6), the right rod chamber (7) and the bottom rod chamber (8)) is that it contains a material conveyance channel (5) passing from the material chamber (1) to the casting chamber (10). The material conveyance channel (5) can be in different shapes such as cylinder or rectangular prism.

Rods (20) to be located in the top rod chamber (4), the left rod chamber (6), the right rod chamber (7) and the bottom rod chamber (8) are monolithic parts consisting of two portions, the portion without threads (21) and the portion with threads (22) which are in equal lengths or in different lengths according to preference. The portion without threads (21) of the each rod (20) which is movable into the casting chamber (10) is in the shape of cylinder or any other prism with various geometric forms (cubical, triangular, etc.) and its surfaces are smooth. The each rod's (20) portion with threads (22) which is fit for the threads inside a nut (23) is in the shape of cylinder, and the threads on its surface are compatible with the threads inside the nut (23) in a manner to enable the linear movement of the rods. The portion without threads (21) of each of the rods (20) which is movable into the casting chamber (10) is equal to the half of the length of the casting chamber's (10) corresponding axis through which the portion without threads (21) moves linearly. For instance, lengths of the portions without threads (21)—which are to move into the casting chamber (10)—of the rods (20) in the top rod chamber (4) and the bottom rod chamber (8) are equal to the half of the perpendicular length (height) of the casting chamber (10); lengths of the portions without threads (21) which are to move into the casting chamber (10)—of the rods (20) in the left rod chamber (6) and the right rod chamber (7) are equal to the half of the horizontal length (width) of the casting chamber (10). In case that the rods' (20) portions without threads (21) and portions with threads (22) are in equal lengths, then the total length of each of the rods (20) is equal to the length of the casting chamber (10) in the axis through which the rod (20) is to move in the casting chamber (10).

For each of the rods (20) there is one nut (23). Interior void of a nut (23) is in the length approximately or precisely equal to the length of the portion with threads (22) of the rod (20). The interior surface of the nut (23) should be threaded in a manner that threads in the nut (23) are compatible with the rod's (20) threads, in other words, it should be threaded in a manner to enable the rotative movement of each one of the nut (23) and the rod (20) in reverse directions. In this regard, the diameter of the nut's (23) treaded interior surface should be slightly larger than the diameter of the rod's (20) portion with threads (22) by a marginal gap to enable the movement. End of the nut (23) through which the portion with threads (22) of the rod (20) is moved is open whereas its other end is closed and on this closed end of the nut (23) exists a screwdriver tip void compatible with the shape of a screwdriver tip (24). Closed ends of the nuts (23) are also attached to a nut layout tray (29). The nut layout tray (29) is a plate consisting of holes with adequate width preventing the nuts (23) from dropping but having adequate tolerance gaps in their edges for the nuts' (23) rotative movements; the nut layout trays (29) are fixated stationarily by being riveted interiorly to the sides of the top rod chamber (4), the left rod chamber (6), the right rod chamber (7) and the bottom rod chamber (8) where they are placed.

Sizes of the rods (20), the rods' portions without threads (21) and portions with threads (22), the nuts (23), the screwdriver tips (24), automatically rotatable screwdriver motors (25) to which screwdriver tips are attached, fixed or internally movable screwdriver trays (26) to which automatically rotatable screwdriver sets consisting of screwdriver tips and screwdriver motors are attached can vary between very small and large values based on the sensitivity level and usage purpose of the machine to be produced. Accordingly, numbers of the rods (20) situated in the top rod chamber (4), the left rod chamber (6), the right rod chamber (7) and the bottom rod chamber (8) can vary between very large and small values. As there is only one nut (23) for each of the rods (20) in the each rod chamber, the number of the rods (20) in the rod chambers and the number of the nuts (23) are equal to each other. Besides, since each screwdriver tip (24) is attached to only one automatically rotatable screwdriver motor (25), the number of the screwdriver tips (24) in the rod chambers and the number of the automatically rotatable screwdriver motors (25) are equal to each other. On the other hand, the number of the screwdriver tips (24) and the automatically rotatable screwdriver motors (25) to be located in the top rod chamber (4), the left rod chamber (6), the right rod chamber (7) and the bottom rod chamber (8) can be less than as well as equal to the number of the rods (20) and the nuts (23) based on the usage purpose of the machine; even designs in which only one screwdriver tip (24) and one screwdriver motor (25) are placed in the each rod chamber can be possible.

In this regard, for the industry type machines that are utilised for the serial production it can be preferred that each number of the screwdriver motors (25) and the screwdriver tips (24) located in the top rod chamber (4), the left rod chamber (6), the right rod chamber (7) and the bottom rod chamber (8) is equal to the number of the rods (20) and the nuts (23) located in the top rod chamber (4), the left rod chamber (6), the right rod chamber (7) and the bottom rod chamber (8) respectively. In such a case, the screwdriver tray (26) can be fixated stationarily by being riveted interiorly to the sides of the top rod chamber (4), the left rod chamber (6), the right rod chamber (7) and the bottom rod chamber (8) just above the nut layout tray (29) in a manner that each screwdriver tip (24) befits to the screwdriver tip void on the external surface of the closed end of the each nut (23).

For the sake of reducing costs in the production of machines, screwdriver trays (26) which are designed in a manner that they contain the screwdriver tips (24) and the screwdriver motors (25) in numbers less than the numbers of the rods (20) and the nuts (23) in the top rod chamber (4), the left rod chamber (6), the right rod chamber (7) and the bottom rod chamber (8) and which are movable horizontally, vertically and perpendicularly can be used as well. In such a case, the screwdriver motors (25) attached to the screwdriver trays (26) and the screwdriver tips (24) attached to these motors make horizontal, vertical and perpendicular movements in addition to the rotative movements. In other words, movement of the screwdriver tips (24) and the screwdriver motors (25) can be performed in horizontal, vertical and perpendicular directions via threaded rollers which are fixated horizontally and perpendicularly to the interior surfaces of the screwdriver tray (26) and are operated by applying electrical currents in order that the rotating process can be applied to the each nut (23) attached to the nut layout tray (29) positioned parallelly in a lower plane. For instance, for a machine in which nut layout trays (29) with 100 nuts (23) and 100 rods (20) attached to these nuts in a pattern of 10 horizontal×10 vertical when looked from up (in other words 10×10 by width and length) are placed in the top rod chamber (4), the left rod chamber (6), the right rod chamber (7) and the bottom rod chamber (8), following placement alternatives in the design of screwdriver trays (26) positioned above the nut layout tray's (29) plane and parallelly to the nut layout tray (29) can be taken into consideration provided that rotative movements of the screwdriver tips (24) and the screwdriver motors (25) are applicable in any situation; i) 100 stationary screwdriver tips (24) and screwdriver motors (25), ii) 10 screwdriver tips (24) and screwdriver motors (25) placed horizontally and movable vertically as well as perpendicularly to enable distancing from nuts' ends and approaching to other group of nuts' ends, iii) 10 screwdriver tips (24) and screwdriver motors (25) placed vertically and movable horizontally and perpendicularly, iv) 25 screwdriver tips (24) and screwdriver motors (25) in a pattern of 5 horizontal×5 vertical and movable vertically, horizontally and perpendicularly, v) 1 screwdriver tip (24) and screwdriver motor (25) movable vertically, horizontally and perpendicularly.

If the number of the screwdriver motors (25) and the screwdriver tips (24) attached to the internally movable screwdriver trays (26) as mentioned in the previous paragraph is less than the half of the number of the nuts (23) positioned in the each horizontal and/or vertical row of the nut layout tray (29), movement of the sets of the screwdriver motors (25) and the screwdriver tips (24) via the treaded rollers attached to the interior sides of the screwdriver tray (26) will not be adequate, therefore to enable moving of the mentioned screwdriver sets towards the internal sections of the tray plane (in a manner that they distance from the sides) internal threaded roller mechanisms placed as nets between the opposite sides of the internally movable screwdriver tray (26) can also be utilised.

The screwdriver motors (25) and the screwdriver tips (24) attached to the internally movable screwdriver trays (26) can be moved via threaded rollers riveted interiorly and perpendicularly to the sides of the top rod chamber (4), the left rod chamber (6), the right rod chamber (7) and the bottom rod chamber (8) in order to be distanced from the nut (23) or the group of the nuts (23) rotating process to which has been completed and subsequently to be approached to the next nut (23) or the group of the nuts (23) rotating process to which is going to be applied. In case that the internally movable screwdriver tray (26) is placed in a rod chamber where the material conveyance channel (5) is located, ie. the top rod chamber (4) and/or the left rod chamber (6), the right rod chamber (7), the bottom rod chamber (8), it should be enabled that movements of the screwdriver tray (26) do not interfere with the material conveyance channel (5) but also it is movable in a manner that rotating process is applicable to all the nuts (23).

Through the portion with threads (22) of the each rod (20) in any chamber, the nut (23) into which this portion is placed, and the screwdriver tip (24) and screwdriver motor (25) which move the nut (23), it is enabled that the rotative movement is transformed to the linear movement; therefore the mentioned parts operate as an actuator mechanism as a whole.

In the top rod chamber (4), the left rod chamber (6), the right rod chamber (7) and the bottom rod chamber (8), in case that instead of the screwdriver trays (26) to which the screwdriver tips (24) and the screwdriver motors (25) are stationarily fixated (defined as fixed screwdriver tray in these Specification and Claims documents), the screwdriver trays (26) designed in a manner to provide the screwdriver tips (24) and the screwdriver motors (25) with the functionality of vertical/horizontal/perpendicular movements (defined as internally movable screwdriver tray in these Specification and Claims documents) are utilised, in addition to the calculation of the numbers of the rotative movements performed—in accordance with the fixed screwdriver trays (26)—by the computer softwares, vertical, horizontal and perpendicular movements of the screwdriver tips (24) and the screwdriver motors (25) attached to the screwdriver trays (26) in the each chamber should also be calculable by the programs. For instance, the numbers of the rotations of the vertically positioned horizontally movable screwdriver tip (24) and the screwdriver motor (25) to be applied to the first vertical row of the nuts (23) attached the nut layout tray (29) and to the second vertical row of the nuts (23) attached to the nut layout tray (29) should be calculable compatibly with the linear distances the rods (20) are to move in the casting chamber (10). Fixed or internal movable screwdriver trays (26) are interiorly riveted to the sides of the rod chambers in a manner that they are positioned in a parallel plane below the external base surfaces of the top rod chamber (4), the left top chamber (6), the right top chamber (7) and the bottom rod chamber (8) and above the nut layout trays (29).

Three-dimensional technical drawings of the model to be produced (final goods such as home appliance, toy and/or intermediate goods such as maquette, prototype, mold) are scaled in accordance with the machine's size and to enable that model is formed initially as the emptiness in the casting chamber (10) numbers of the increments by which each rod (20) situated in the top rod chamber (4), the left rod chamber (6), the right rod chamber (7) and the bottom rod chamber (8) is moved are calculated via the proper computer softwares to be constituted. In the machines with the fixed screwdriver trays (26) electrical current is applied to the each screwdriver motor (25)—to enable it is rotated as many times as the number of pertinent increments—via the logic board and electrical circuit component (19) so that rotative movement of the screwdriver tip (24) to which the screwdriver motor (25) is attached and the nut (23) corresponding to the screwdriver tip (24), the rotative movement of the rod's (20) portion with threads (22) which is inside the nut (23) in the reverse direction of the nut's (23) rotative movement and in the consequence of all these movements linear movement of the rod (20) is performed. Therefore, portion without threads (21) of the rod (20) is moved towards the casting chamber (10) by the calculated number of increments. The top side holey plate (14), the left side holey plate (11), the right side holey plate (12) and the bottom side holey plate (15)—which are the surfaces where the casting chamber (10) is adjacent to the top rod chamber (4), the left rod chamber (6), the right rod chamber (7) and the bottom rod chamber (8) respectively—have the property of having holes corresponding to the positioning coordinates of the rods (20) in a manner that each rod's (20) portion without threads (21) are movable into the casting chamber (21). In case that the each rod's (20) portion with threads (22) and the each rod's portion without threads (21) which is movable into the casting chamber (10) have the equal lengths, the total length of the rod (20) is to be equal to the length of the casting chamber (10) in the axis through which the rod (20) is moved, when tolerance gaps are exempted.

In case that internally movables crewdriver trays (26) are utilised there should be a determined tolerance gap between the screwdriver tips (24) and the nuts' (23) external base surfaces with the screwdriver tip voids, and the screwdriver tips (24) should be movable towards the nuts' (23) dosed ends via the electrical currents after the screwdriver tips (24) and the screwdrivers motors (25) are positioned in the screwdriver tray (26), also the pertinent screwdriver tips (24) and the screwdriver motors (25) should be movable in the reverse direction after the rotating process applied to the nuts (23) are completed so that their (the screwdriver tips' (24) and the screwdriver motors' (25)) next horizontal, vertical or perpendicular movement can be commenced.

All the rods (20) are moved into the casting chamber (10) linearly through—as described in detail above—the screwdriver trays' (26) movements (if the internally movable screwdriver tray is utilised) and the rotative movements of the screwdriver motors (25) and consequently of the screwdriver tips (24) and the nuts (23) in accordance with the calculations performed by the pertinent computer programs.

As the result of the completion of the rods' (20) calculated movements as stated above, in the casting chamber (10) the emptiness which has the three-dimensional shape of the model is constituted. Besides, in a manner that enables the movement of the material into the mentioned emptiness and also as being a property of the software that will be used, a material passage route between the peak of the emptiness in the shape of the model and the bottom exit point which is opened to the casting chamber (10)—of the material conveyance channel (5) situated in the top rod chamber (4) is formed.

After the rods (20) complete their movements in a manner that forms the emptiness in the shape of the model and the material passage route in the casting chamber (10), the casting process is commenced.

The casting process starts with the opening of the material conveyance tap (3) and ends with the filling of the emptiness in the shape of the model formed within the casting chamber (10) and the subsequent dosing of the material conveyance tap (3). The moment of the closure of the material conveyance tap (3) should be the same moment when the material with the amount enough to fill the model emptiness has been passed through the material conveyance tap (3). Through the accurate determination of the closure moment of the material conveyance tap (3), it is enabled that only the emptiness which has the shape of the model is filled within the casting chamber (10) whereas the material passage route formed in the casting chamber (10) stays empty. Benefit of this is the prevention of the existence of an abundant part in the shape of the material passage route above the peak of the model to be solidified via the subsequent process stages such as heating, etc. to be applied to the casting chamber (10). Otherwise, after the extraction of the model from the casting chamber (10), it would be required to break off the mentioned abundant part.

In order to determine the closure moment of the material conveyance tap (3) accurately, different methods can be applied. One of such methods can consist of; the calculation of the weight of the material to be poured through the multiplication of the density of the material to be used for the casting which can be defined into the pertinent softwares and the volume of the emptiness which can also be calculated by the softwares; the calculation of the difference between the weight of the material existing in the material chamber (1)—measured by a weight measure device (27) attached to the material chamber (1)—just before the opening of the material conveyance tap (3) and the weight of the material which will fill the emptiness in the shape of the model; and the closure of the material conveyance tap (3) through the electrical signal just at the moment when the weight measure device (27) indicates that weight of the material remaining in the material chamber (1) becomes equal to the difference value which has been calculated as described above.

Another method can consist of; the measurement of the height of the material existing in the material chamber (1) just before the opening of the material conveyance tap (3), and the closure of the material conveyance tap (3) through the signal conveyed by the electrical circuit just at the moment when the height value pertaining to the reached fullness level calculated by subtracting the quotient value—which is obtained by dividing the volume of the emptiness in the shape of the model by the base area of the material chamber (1)—from the material height value measured before the opening of the material conveyance tap (3) is indicated by the material height gauge (29) (it has been assumed that the material chamber (1) is a rectangular prism, in cases that the chamber is in different shapes, the methods utilised by the softwares to calculate the height difference are required to be varied accordingly).

Sizes of the particles of the material to be used should be large enough to enable that the material passes only through the passage route in the casting chamber (10) in order to reach to the emptiness in the shape of the model without leaking into the capillary gaps between the sides of the rods (20) which have been moved in a manner to form the mentioned emptiness and the passage route.

After the filling of the emptiness in the shape of the model with the material conveyed into the casting chamber (10) and the subsequent stopping of the material conveyance via the closure of the material conveyance tap (3), processes of heating in a temperature determined in accordance with the material type and subsequent cooling are applied via the heating and cooling equipment (9) in a manner that material particles strongly adhere to each other so that the material in the shape of the model takes the monolithic form. In the practice, the elongation and expansion coefficients of the materials used for the parts of the machine should be taken into account and while heating process is applied, for instance, it should be enabled that the rods (20) have the proper width to prevent their sides sticking to each other and to the left side holey plate (11), the right side holey plate (12), the top side holey plate (14) and the bottom side holey plate (15) which they pass through.

After the applying of the thermal (heating, cooling) processes or any other proper processes—in accordance with the type of the material being casted—which enables that the material becomes monolithic, the model acquires the monolithic characteristic so that it becomes extractable from the casting chamber (10). In order to extract the model from the casting chamber (10), it is required that the rods (20) are receded from the casting chamber (10) to relevant rod chambers following the completion of the thermal processes. Accordingly, movements with the same magnitudes but in the reverse directions of the movements of the screwdriver tray (26) (if tray is internally movable) and the screwdriver motors (25) as well as the attached screwdriver tips (24) are applied and therefore it is enabled that the rods (20) are receded from the casting chamber (10).

Consequently, only the produced model remains in the casting chamber (10). With the completion of the receding movements of the rods (20), the front panel (13) and/or the back side plate (16) having the property of cover through which model is extracted becomes operable (cover should be unopenable before the completion of the receding movements; for this purpose, mechanism which prevents the opening of the cover of the washing machines before the completion of washing process can be used). The model suitable to be used as final good or intermediate production good is extracted from the machine by opening the casting chamber's front panel (13) and/or back side plate (16) having the property of cover.

The invention claimed is:

1. A computer aided flexible model production machine, comprising:
   a casting chamber, a left side holey plate, a right side holey plate, a top side holey plate, a bottom side holey plate, a front panel a back side plate;
   a left rod chamber and a right rod chamber, wherein the left rod chamber and the right rod chamber are adjacent to two opposite sides of the casting chamber respectively, wherein a plurality of first rods are placed in the left rod chamber and the right rod chamber,
   a top rod chamber is adjacent to a top surface of the casting chamber, wherein a plurality of second rods are placed in the top rod chamber,
   a bottom rod chamber is adjacent to a bottom surface of the casting chamber, wherein a plurality of third rods are placed in the bottom rod chamber;
   a material chamber is adjacent to a top surface of the top rod chamber for containing a material to be poured, and a material chamber cover is provided to put the material into the material chamber through the material chamber cover;
   a material conveyance tap is opened via electrical current applied when a pouring process starts to enable a conveyance of the material to be poured from the material chamber to a material conveyance channel and the material conveyance channel is provided in the top rod chamber and closed via electrical current applied at a moment when amount of a passed material is calculated based on a plurality of measurement results to be obtained from a weight measure device of the material chamber or a material height gauge of the material chamber becomes equal to a material amount required to fill an emptiness in a shape of a model;
   a heating and a cooling equipment is positioned in a manner to distribute heat in a balanced way into the casting chamber and apply a thermal process to make the material monolithic after a completion of the conveyance of the material into the emptiness in the shape of the model;
   a plurality of screwdriver trays, wherein, the plurality of screwdriver trays are fixed or internally movable, the plurality of screwdriver trays are positioned in the top rod chamber,
   the left rod chamber, the right rod chamber and the bottom rod chamber and the plurality of screwdriver trays comprise a mechanical mechanism that enable a movement of a first plurality of rod portions of the plurality of first rods, the plurality of second rods and the plurality of third rods without threads into the casting chamber from the top rod chamber,
   the left rod chamber, the right rod chamber and the bottom rod chamber;
   a plurality of automatically rotatable screwdriver motors;
   a plurality of screwdriver tips;
   a plurality of nuts, wherein a plurality of second rod portions of the plurality of first rods, the plurality of second rods and the plurality of third rods with threads compatible with threads inside the plurality of nuts are placed into the plurality of nuts; and the plurality of nuts are attached to a plurality of nut layout trays;
   a logic board and an electrical circuit component providing electrical currents required to enable forward and backward movements as well as clockwise and counter clockwise movements;
   coordinates and numbers of increments of the forward and backward movements and the clockwise and conterclockwise movements are calculated by a computer software of a plurality of parts of the mechanical mechanism, opening and closing movements of the material conveyance tap, and a plurality of processes are applied by the heating and the cooling equipment;
   a power source chamber comprises at least one battery, or a combination of a power cable and a plug, or a combination of renewable energy generators, storers and transmitters;
   a USB socket, or a wireless data receiver is placed in the front panel in a manner to establish a connection of a tablet computer or a smartphone, in the tablet computer or the smartphone wherein the computer software to be used is loaded to the logic board and the electrical circuit component.

2. The computer aided flexible model production machine of claim 1, the material chamber further comprising: a plurality of side plates wherein edges of the side plates are riveted to each others' edges; a top plate comprises the material chamber cover, wherein the material chamber cover is openable and closable and edges of the material chamber cover are riveted to the side plates; the material height gauge, or the weight measure device, starting from a moment a process begins, measure a height, or a weight of the casting material inside the material chamber and send the plurality of measurement results to the logic board and the electrical circuit component continuously throughout the process; a bottom surface plate comprises a hole at a center of the bottom surface plate for passage of the casting material; and the material conveyance tap is automatically openable, closable, slidable or perpendicullary movable at the passage of the casting material; and edges of the passage of the casting material are riveted to the plurality of side plates.

3. The computer aided flexible model production machine of claim 1, wherein, in order to enable a passage of the casting material from the material chamber to the casting chamber, the material conveyance tap is closed before the pouring process begins, openable via a signal sent through the logic board and the electrical circuit component after a completion of a plurality of movements of the plurality of first rods, the plurality of second rods or the plurality of third rods towards the casting chamber, and reclosable via the signal sent from the logic board and an electrical circular component at a moment either when, in case that measurement device to be utilised is the weight measure device, a change of a weight in the material chamber becomes equal to a to-be produced model's weight and the to be produced model's weight is calculated by the computer software or when, in case that measurement device to be utilised is the material height gauge, a volume of a used material is calculated by the computer software according to a change in a material height and a geometrical shape of the material chamber becomes equal to a volume of the model and the volume of the model is also calculated by the computer software.

4. The computer aided flexible model production machine of claim 1, wherein, the top rod chamber further comprises a plurality of top surface plates and a plurality of side surface plates; the material conveyance channel is perpendicular and further comprises a hole at a top end located in the top surface plate's center in a manner that corresponds to a passage point in a center of the bottom surface of the material chamber where the material conveyance tap is situated and having a same width as the passage point, and a hole at a bottom end located in the top surface of the casting chamber and having the same width as the material conveyance tap; the nuts, in order to enable a plurality of linear movements of the plurality of second rods of the top rod chamber, the inner surface of each nut is compatible with an outer surface of the each of the plurality of rod portions with threads, the top end of each nut is closed in a manner that the outer surface of the top end of each nut contains a void compatible with the screwdriver tip, and the bottom end of each nut is open; the nut layout tray further comprises a plurality of holes wherein the nuts' tops are attached and the plurality of holes prevent the nuts from dropping but have tolerance gaps in edges for rotative movements of the plurality of nuts, and the plurality of holes are interiorly riveted to the side surfaces of the top rod chamber in a manner to be positioned in a plane parallel to the top surface plate; wherein, a plurality of electronical screwdriver motors and the plurality of screwdriver tips are attached to the screwdriver tray to enable a rotation of the nuts, a screwdriver tray is positioned in a plane between the top surface plate of the top rod chamber and the nut layout tray, the screwdriver tray is interiorly riveted to the side surface plates of the chamber.

5. The computer aided flexible model production machine of claim 1, wherein, the left rod chamber, the right rod chamber and the bottom rod chamber further comprise a plurality of exterior surface plates and a plurality of side surface plates; the plurality of rods placed within perpendicularly to the exterior base surface plate and parallelly to the plurality of side surface plates; an inner surface of each nut is compatible with the outer surface of the each of the plurality of rod portions with threads in order to enable the plurality of linear movements of the plurality of rods the top end of each nut is closed in a manner that the outer surface of this top end contains a void compatible with the screwdriver tip, and the bottom end of each nut is open; the nut layout tray further comprises a plurality of holes, wherein the nuts' tops are attached to the nut layout tray via the plurality of holes and the plurality of holes prevent the nuts from dropping but have tolerance gaps in their edges for rotative movements of the plurality of nuts, each nut layout tray is interiorly riveted to the side surfaces of the left rod chamber, the right rod chamber or the bottom rod chamber in a manner to be positioned in a plane parallel to the exterior surface plate of the left rod chamber, the right rod chamber or the bottom rod chamber respectively; and wherein the plurality of electronical screwdriver motors and screwdriver tips are attached to the plurality of screwdriver trays to enable a rotation of the nuts, each screwdriver tray is positioned in a plane between a exterior surface plate and the nut layout tray, and each screwdriver tray is interiorly riveted to the side surfaces of the left rod chamber, the right rod chamber or the bottom rod chamber.

6. The computer aided flexible model production machine of claim 1, wherein, the casting chamber comprises the left side holey plate, the right side holey plate, the top side holey plate and the bottom side holey plate, the front panel and the back side plate; wherein the left side holey plate, the right side holey plate, the top side holey plate and the bottom side holey plate contain holes located with specific intervals in a manner that allows a plurality of passages and a plurality of movements towards the casting chamber of all rods within the top rod chamber, the left rod chamber, the right rod chamber and the bottom rod chamber are wide enough for a passage of the rods; on the top side holey plate, a further hole, in addition to the holes through wherein the rods pass, positioned as corresponding to the bottom end of the material conveyance channel located at the center of the top rod chamber; the front panel further comprising a plurality of voids for placing tablet computers, phones and devices containing softwares to be used in operating the machine be placed and the USB socket, or the wireless data receiver in a manner to establish the connection of the devices containing a plurality of relevant softwares to the logic board and electrical circuit component; the front panel also having a property of a cover, wherein the cover becomes openable after a plurality of machine operation stages are completed to enable an extraction of the model produced in the casting chamber.

7. The computer aided flexible model production machine of claim 1, wherein, each of the first plurality of rods, the second plurality of rods and the third plurality of rods is a monolithic part comprising two portions with equal or different lengths, wherein, the two portions include a first rod portion without threads and a second rod portion with threads, wherein the first rod portion is movable to the casting chamber is cylindrical or in a shape of a plurality of smooth surfaced prism bases and each of the rods has a length equal to a half of a horizontal length of a corresponding axis of the casting chamber and total length of the each rod is equal to a total length of a pertinent axis, and the second rod portion is movable throughout the nut and has a property of enabling through making a plurality of rotative movements in a reverse direction of the nut's rotative movements.

8. The computer aided flexible model production machine of claim 1, wherein, the plurality of second rod portions with threads are moved in the plurality of nuts, an interior void of each nut has a same length as each of the plurality of second rod portions with threads; wherein, threads in each nut are compatible with the threads of the plurality of second rod portions; a diameter of the interior void of each nut is larger than a diameter of the plurality of second rod portions with threads by a marginal gap to enable a movement of each second rod portion.

9. The computer aided flexible model production machine of claim 1, the nuts' closed ends are attached to the nut layout tray, the nut layout tray comprises the plurality of holes have a width preventing the nuts from dropping, and having tolerance gaps in a plurality of edges of the plurality of holes allows the nuts' rotative movements; a further hole in case that the nut layout tray is placed within the top rod chamber in the top rod chamber the material conveyance channel is positioned as corresponding to a route of the material conveyance channel and being wide enough for a passage of the material conveyance channel; the nut layout tray is a plate; the nut layout tray is placed in a plane parallel to an exterior surface plate which means a plate at the top side of the top rod chamber, a plate at the left side of the left rod chamber, a plate at the right side of the right rod chamber, a plate at the bottom side of the bottom rod chamber of the top rod chamber, the left rod chamber, the right rod chamber and the bottom rod chamber where each is placed and also parallel to the screwdriver tray, the screwdriver tray is positioned in a plane below the exterior surface plate; the nut layout tray is interiorly riveted to a plurality of sides of the top rod chamber, the left rod chamber, the right rod chamber and the bottom rod chamber.

10. The computer aided flexible model production machine of claim 1, wherein, the plurality of screwdriver trays are fixed and each screwdriver tray comprises the plurality of automatically rotatable screwdriver motors and the plurality of screwdriver tips attached to the plurality of automatically rotatable screwdriver motors, wherein numbers of the plurality of screwdriver tips are equal to numbers of the plurality of second rods located in the top rod chamber, the plurality of first rods located in the left rod chamber, the plurality of first rods located in the right rod chamber and the plurality of third rods located in the bottom rod chamber where each is placed; the each screwdriver tray is in a plane below an outer surface of the top rod chamber, the left rod chamber, the right rod chamber and the bottom rod chamber and positioned in a manner that the each screwdriver tip is attached, respectively, to a corresponding automatically rotatable screwdriver motor of the plurality of automatically rotatable screw driver motors and befits to a screwdriver tip void on an external surface of a closed end of the each nut attached to the nut layout tray; the each screwdriver tray is fixated interiorly to the sides of the top rod chamber, the left rod chamber, the right rod chamber and the bottom rod chamber; the screwdriver tray comprises a hole in case that the screwdriver tray is placed within the top rod chamber where the material conveyance channel is positioned as corresponding to the route of the material conveyance channel and being wide enough for the passage of the material conveyance channel.

11. The computer aided flexible model production machine of claim 1, wherein, the plurality of screwdriver trays are internally movable and each screwdriver tray comprises the plurality of screwdriver motors and the screwdriver tips numbers of the screwdriver tray is between one and a number less than the number of the rods located in the top rod chamber, the left rod chamber, the right rod chamber and the bottom rod chamber where each is placed; a plurality of outer surfaces of a plurality of edges of the each screwdriver tray are riveted interiorly to the plurality of sides of the top rod chamber, the left rod chamber, the right rod chamber and the bottom rod chamber in a manner that allows a plurality of horizontal movements, a plurality of vertical movements and a plurality of perpendicular movements of the plurality of screwdriver tips and the plurality of automatically rotatable screwdriver motors to which the plurality of screwdriver tips are attached in order to apply rotative movements to the each nut attached to the nut layout tray, wherein the nut layout tray is located in a plane just below the screwdriver tray; a plurality of interior surfaces of the plurality of edges of the each screwdriver tray comprise a plurality of threaded rollers, wherein the plurality of threaded rollers are placed horizontally through the width, vertically through the length and perpendicularly and movable via the electrical currents to be applied; in case that the number of the plurality of automatically rotatable screwdriver motors and the plurality of screwdriver tips attached to the plurality of screwdriver trays is less than half of the number of nuts positioned in horizontal row, or a vertical row of the nut layout tray, the each screwdriver tray comprises a plurality of internal threaded roller mechanisms placed as a plurality of nets between a plurality of opposite sides of the screwdriver tray to enable the movements of the plurality of automatically rotatable screwdriver motors and the plurality of screwdriver tips towards the internal sections of the tray plane; in case that the screwdriver tray is placed within the top rod chamber where the material conveyance channel is located, the screwdriver tray has a property of a movability in a manner that movements of the plurality of screwdriver tray do not interfere with the material conveyance channel but also rotating process is applicable to all nuts.

\* \* \* \* \*